United States Patent [19]
Suga et al.

[11] Patent Number: 5,811,364
[45] Date of Patent: *Sep. 22, 1998

[54] CATALYST SYSTEM FOR THE PURIFICATION OF EXHAUST GAS

[75] Inventors: Katsuo Suga, Yokosuka; Toru Sekiba, Yokohama, both of Japan

[73] Assignee: Nissan Motor Co., Ltd., Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 504,864

[22] Filed: Jul. 20, 1995

[30] Foreign Application Priority Data

Aug. 23, 1994 [JP] Japan ..................... 6-198431

[51] Int. Cl.⁶ ................. B01J 23/58; B01J 8/04
[52] U.S. Cl. ............ 502/328; 502/326; 423/213.5
[58] Field of Search ............... 423/213.2, 213.5, 423/213.7; 502/326, 328

[56] References Cited

U.S. PATENT DOCUMENTS

| | | | |
|---|---|---|---|
| 5,075,275 | 12/1991 | Murakami et al. | 502/303 |
| 5,332,554 | 7/1994 | Yasaki et al. | 422/180 |
| 5,338,715 | 8/1994 | Iida et al. | 502/64 |
| 5,448,887 | 9/1995 | Takeshima | 60/278 |
| 5,492,878 | 2/1996 | Fujii et al. | 502/304 |
| 5,494,878 | 2/1996 | Murakami et al. | 502/304 |
| 5,597,771 | 1/1997 | Hu et al. | 502/304 |

FOREIGN PATENT DOCUMENTS

| | | |
|---|---|---|
| 61-23436 | 10/1986 | Japan . |
| 64-583-47 | 3/1989 | Japan . |
| 1-210032 | 8/1989 | Japan . |

*Primary Examiner*—Bekir L. Yildirim
*Attorney, Agent, or Firm*—McDermott, Will & Emery

[57] ABSTRACT

A catalyst system for the purification of exhaust gas comprises at least two catalysts disposed on an exhaust system side of an engine and at least containing palladium as a catalyst component. In this case, each of catalysts disposed on upstream side and downstream side contains a given amount of an alkaline earth metal compound as an oxide conversion per 1 L of a carrier.

5 Claims, No Drawings

CATALYST SYSTEM FOR THE PURIFICATION OF EXHAUST GAS

BACKGROUND OF THE INVENTION

1. Field of the Present Invention

This invention relates to a catalyst system for the purification of exhaust gas, and more particularly to a catalyst system for the purification of exhaust gas capable of efficiently purifying hydrocarbon (HC), carbon monoxide (CO) and nitrogen oxide (NOx) in an exhaust gas discharged from an internal combustion engine for automobiles and the like.

2. Description of the Related Art

As the catalyst system for the purification of exhaust gas, there has generally been used a system that a catalyst for the purification of exhaust gas comprising an active catalyst component such as platinum (Pt), palladium (Pd) and rhodium (Rh), alumina as a carrier and a cocatalyst such as cerium oxide or the like is disposed on an exhaust system side of an engine. The number of the catalysts disposed on the exhaust system side differs in accordance with a class of an automobile to be applied. If the purification performance of exhaust gas is not sufficiently attained only by the single catalyst, it is necessary to dispose plural catalysts.

As the catalyst system using such plural catalysts, there are proposed a system in which a catalyst for NOx reduction is disposed on an upstream side and a catalyst for HC and CO oxidation is disposed on a downstream side (Society of Automotive Engineering (SAE) 750176), a system in which Pt/Rh catalyst is disposed on an upstream side and Pd catalyst is disposed on a downstream side (JP-A-61-234936) and so on.

In general, the temperature of exhaust gas discharged from the engine is highest immediately after an outlet of the engine and becomes lower away from the engine. Therefore, it is desirable that if it is intended to dispose plural catalysts on the exhaust system side of the engine, a catalyst having a high catalyst activity at a high temperature zone is disposed on the upstream side and a catalyst having a high catalyst activity at a low temperature zone is disposed on the downstream side.

However, this point is not quite noticed in the aforementioned conventional catalyst systems, so that merits in the use of plural catalysts are not sufficiently utilized.

SUMMARY OF THE INVENTION

It is, therefore, an object of the invention to provide a catalyst system capable of efficiently purifying an exhaust gas by disposing a catalyst having a high purification performance at a high temperature zone on an upstream side and disposing a catalyst having a high purification performance at a low temperature zone on a downstream side in view of the difference of exhaust gas temperature between positions of the catalysts to be disposed.

The inventors have made various studies in order to solve the above problems and found that the upstream side and downstream side catalysts each satisfying the above performances are obtained when a given amount of an alkaline earth metal compound is added to each of the upstream side and downstream side catalysts containing at least Pd as an active catalyst component, and as a result the invention has been accomplished.

According to the invention, there is the provision of a catalyst system for the purification of exhaust gas comprising at least two catalysts disposed on an exhaust system side of an engine and at least containing palladium as a catalyst component, in which a catalyst disposed on an upstream side contains 0.1–20 g of an alkaline earth metal compound as an oxide conversion per 1 L of a carrier and a catalyst disposed on a downstream side contains more than 20 g but not more than 100 g of an alkaline earth metal compound as an oxide conversion per 1 L of a carrier.

DESCRIPTION OF THE PREFERRED EMBODIMENTS

Since the upstream side catalyst is exposed to the exhaust gas of higher temperature, it is required to have a performance for the purification of exhaust gas at a high temperature zone. In this connection, the inventors have found that when the alkaline earth metal compound is added to the catalyst at least containing Pd, the performance for the purification of exhaust gas at a high temperature zone is enhanced, but if the amount of the compound added is too large, the performance for the purification of exhaust gas lowers. That is, it has been confirmed that the amount of the alkaline earth metal compound added is critical in the Pd-containing upstream side catalyst.

Since the exhaust gas of lower temperature passes through the downstream side catalyst, it is required to develop the performance for the purification of exhaust gas at a low temperature zone. In this connection, the inventors have found that when the alkaline earth metal compound is added to the catalyst at least containing Pd, a high activity at low temperature is obtained, but the amount of the alkaline earth metal compound added should be made large in order to obtain sufficient effect. That is, it has been found that the alkaline earth metal compound should be added in an amount larger than the case of adding to the upstream side catalyst because the sufficient activity at low temperature is not obtained when the amount of the alkaline earth metal compound added is equal to that of the upstream side catalyst.

As mentioned above, the optimum amount of the alkaline earth metal compound added is different between the upstream side catalyst and the downstream side catalyst. If the amount of the alkaline earth metal compound added is the same between the upstream side catalyst and the downstream side catalyst, either of purification performance at high temperature zone of the upstream side catalyst or purification performance at low temperature zone of the downstream side catalyst becomes insufficient and hence the purification performance for the exhaust gas undesirably lowers as compared with that of the catalyst system according to the invention.

As the alkaline earth metal compound, the use of barium compound is described in JP-A-1 -58347, or the use of strontium compound is described in JP-A-1-210032. In this case, the improvement of durability is mentioned as an effect. However, the reactivity at the temperature of the exhaust gas is not considered at all in these conventional techniques, so that the satisfactory purification performance for the exhaust gas is not obtained in these conventional techniques when the temperature of the exhaust gas is considered as in the invention.

According to the invention, the upstream side catalyst is arranged just after an engine manifold, while the downstream side catalyst is disposed below a floor of a vehicle body. If the purification performance is insufficient with a single upstream side catalyst and a single downstream side catalyst, plural catalysts may be disposed on either of the upstream side or the downstream side or both.

In the upstream side catalyst, the amount of alkaline earth metal compound added is 0.1–20 g as an oxide conversion per 1 L of a carrier. When the amount is less than 0.1 g/L, the purification performance at high temperature zone is insufficient, while when it exceeds 20 g/L, the purification performance at high temperature zone undesirably lowers.

In the downstream side catalyst, the amount of alkaline earth metal compound added is more than 20 g but not more than 100 g as an oxide conversion per 1 L of a carrier. When the amount is not more than 20 g/L, the sufficient activity at low temperature is not obtained, while when it exceeds 100 g/L, the significant effect by the increase of the amount is not recognized.

The catalyst according to the invention will be described in detail below.

As the catalyst used in the invention, mention may be made of a catalyst obtained by coating at least Pd, particularly Pd and Rh and/or Pt as a noble metal for an active catalyst component, alumina as a carrier for the noble metal, an alkaline earth metal compound and, if necessary, a cocatalyst component such as cerium oxide or the like onto a monolithic carrier, and so on.

The monolithic carrier may be made from a refractory material and includes, for example, ceramics such as cordierite or the like, and metals such as ferritic stainless steel or the like.

In the catalyst according to the invention, the amount of the noble metal is not particularly restricted as much as the necessary catalyst activity can be developed, but is usually within a range of 0.01–10 g per 1 L of the carrier.

The carrier for the noble metal is suitable to have an excellent heat resistance and is favorably an activated alumina. The carrier is preferable to have a specific surface area of 100–300 m$^2$/g. Furthermore, in order to improve the heat resistance, an activated alumina containing a rare earth element, zirconium or the like may be used. The amount of the activated alumina is favorably within a range of 50–300 g per 1 L of the catalyst.

As the alkaline earth metal compound, use may be made of nitrates, acetates, carbonates, hydroxides, oxides and the like of strontium and barium. The catalyst according to the invention contains at least one compound among these compounds.

The catalyst according to the invention is prepared by a method wherein noble metal, activated alumina, cocatalyst component such as cerium oxide or the like and alkaline earth metal compound are mixed at wet state to prepare an aqueous slurry and then the slurry is applied to a monolithic carrier and dried and calcined, a method wherein noble metal, activated alumina and cocatalyst component such as cerium oxide or the like are mixed at wet state to prepare an aqueous slurry and then the slurry is applied to a monolithic carrier and dried and calcined and thereafter an aqueous solution of alkaline earth metal compound is impregnated therein, and the like.

The following examples are given in illustration of the invention and are not intended as limitations thereof.

EXAMPLE 1

An activated alumina powder is immersed in an aqueous solution of palladium nitrate and dried and calcined at 400° C. for 1 hour to obtain Pd-carried activated alumina powder. The concentration of Pd in this powder is 2.0% by weight. Into a porcelain ball mill are charged 616 g of the Pd-carried activated alumina powder, 284 g of activated alumina powder and 900 g of aqueous nitric acid solution, which are mixed and pulverized to obtain a slurry.

The resulting slurry is applied onto cordieritic monolithic carrier (1.7 L, 400 cells), and dried at 130° C. and calcined at 400° C. for 1 hour after excessive slurry is removed off from the cell by blowing air stream. Such a procedure is repeated two times to obtain a catalyst having a coating weight of 190 g/L (carrier).

Separately, an activated alumina powder is immersed in an aqueous solution of rhodium nitrate and dried and calcined at 400° C. for 1 hour to obtain Rh-carried activated alumina powder. The concentration of Rh in this powder is 1.0% by weight. Into a porcelain ball mill are charged 529 g of the Rh-carried activated alumina powder, 371 g of activated alumina powder and 900 g of aqueous nitric acid solution to obtain a slurry. The resulting slurry is applied onto the above catalyst to obtain a catalyst No. 1 having a coating weight of 230 g/L (carrier).

The catalyst No. 1 is immersed in an aqueous solution of barium acetate, and after excessive barium acetate solution is removed off by blowing air stream, it is dried at 130° C. and then calcined at 400° C. for 1 hour to obtain a catalyst No. 2 having a coating weight of 235 g/L (carrier). In this case, the Pd amount is 2.6 g, and the Rh amount is 0.24 g, and the Ba amount as barium oxide is 5 g per 1 L of the catalyst.

The catalyst No. 1 is immersed in an aqueous solution of barium acetate, and after excessive barium acetate solution is removed off by blowing air stream, it is dried at 130° C. and then calcined at 400° C for 1 hour to obtain a catalyst No. 3 having a coating weight of 260 g/L (carrier). In this case, the Pd amount is 2.6 g, and the Rh amount is 0.24 g, and the Ba amount as barium oxide is 30 g per 1 L of the catalyst.

The catalyst No. 1 is immersed in an aqueous solution of barium acetate, and after excessive barium acetate solution is removed off by blowing air stream, it is dried at 130° C. and then calcined at 400° C. for 1 hour to obtain a catalyst No. 4 having a coating weight of 230.5 g/L (carrier). In this case, the Pd amount is 2.6 g, and the Rh amount is 0.24 g, and the Ba amount as barium oxide is 0.5 g per 1 L of the catalyst.

The catalysts No. 1–No. 4 are rapidly aged under conditions shown in the following test example. Then, the purification performance of exhaust gas is measured by arranging the catalyst No. 2 just after an engine manifold in an engine exhaust system and disposing the catalyst No. 3 below a floor of a vehicle body at a downstream side of the exhaust system.

EXAMPLE 2

The purification performance of exhaust gas is measured by arranging the catalyst No. 4 just after the engine manifold and disposing the catalyst No. 3 below the floor at the downstream side of the exhaust system.

EXAMPLE 3

An activated alumina powder is immersed in an aqueous solution of palladium nitrate and dried and calcined at 400° C. for 1 hour to obtain Pd-carried activated alumina powder. The concentration of Pd in this powder is 4.0% by weight. Into a porcelain ball mill are charged 600 g of the Pd-carried activated alumina powder, 300 g of activated alumina powder and 900 g of aqueous nitric acid solution, which are mixed and pulverized to obtain a slurry.

The resulting slurry is applied onto cordieritic monolithic carrier (1.7 L, 400 cells), and dried at 130° C. and calcined at 400° C. for 1 hour after excessive slurry is removed off from the cell by blowing air stream. Such a procedure is repeated two times to obtain a catalyst No. 5 having a coating weight of 210 g/L (carrier).

The catalyst No. 5 is immersed in an aqueous solution of barium acetate, and after excessive barium acetate solution is removed off by blowing air stream, it is dried at 130° C. and then calcined at 400° C. for 1 hour to obtain a catalyst No. 6 having a coating weight of 220 g/L (carrier). In this case, the Pd amount is 5.7 g, and the Ba amount as barium oxide is 10 g per 1 L of the catalyst.

The catalyst No. 5 is immersed in an aqueous solution of barium acetate, and after excessive barium acetate solution is removed off by blowing air stream, it is dried at 130° C. and then calcined at 400° C. for 1 hour to obtain a catalyst No. 7 having a coating weight of 250 g/L (carrier). In this case, the Pd amount is 5.7 g, and the Ba amount as barium oxide is 40 g per 1 L of the catalyst.

The catalysts No. 5–No. 7 are rapidly aged under conditions shown in the following test example. Then, the purification performance of exhaust gas is measured by arranging the catalyst No. 6 just after an engine manifold in an engine exhaust system and disposing the catalyst No. 7 below a floor of a vehicle body at a downstream side of the exhaust system.

EXAMPLE 4

The catalyst No. 5 is immersed in an aqueous solution of strontium nitrate, and after excessive strontium nitrate solution is removed off by blowing air stream, it is dried at 130° C. and then calcined at 400° C. for 1 hour to obtain a catalyst No. 8 having a coating weight of 220 g/L (carrier). In this case, the Pd amount is 5.7 g, and the Sr amount as strontium oxide is 10 g per 1 L of the catalyst.

The catalyst No. 5 is immersed in an aqueous solution of strontium nitrate, and after excessive strontium nitrate solution is removed off by blowing air stream, it is dried at 130° C. and then calcined at 400° C. for 1 hour to obtain a catalyst No. 9 having a coating weight of 250 g/L (carrier). In this case, the Pd amount is 5.7 g, and the Sr amount as strontium oxide is 40 g per 1 L of the catalyst.

The catalysts No. 8–No. 9 are rapidly aged under conditions shown in the following test example. Then, the purification performance of exhaust gas is measured by arranging the catalyst No. 8 just after an engine manifold in an engine exhaust sy0stem and disposing the catalyst No. 9 below a floor of a vehicle body at a downstream side of the exhaust system.

COMPARATIVE EXAMPLE 1

The purification performance is measured in the same manner as in Example 1 except that the catalyst No. 1 is arranged just after the engine manifold and the catalyst No. 1 is disposed below the floor at the downstream side.

COMPARATIVE EXAMPLE 2

The purification performance is measured in the same manner as in Example 1 except that the catalyst No. 3 is arranged just after the engine manifold and the catalyst No. 3 is disposed below the floor at the downstream side.

COMPARATIVE EXAMPLE 3

The purification performance is measured in the same manner as in Example 1 except that the catalyst No. 2 is arranged just after the engine manifold and the catalyst No. 2 is disposed below the floor at the downstream side.

COMPARATIVE EXAMPLE 4

The purification performance is measured in the same manner as in Example 1 except that the catalyst No. 5 is arranged just after the engine manifold and the catalyst No. 5 is disposed below the floor at the downstream side.

COMPARATIVE EXAMPLE 5

The purification performance is measured in the same manner as in Example 1 except that the catalyst No. 7 is arranged just after the engine manifold and the catalyst No. 7 is disposed below the floor at the downstream side.

TEST EXAMPLE

Each of the catalyst systems in Examples 1–4 and Comparative Examples 1–5 is aged under the following conditions and then the activity thereof is evaluated as follows.

| Aging conditions | |
| --- | --- |
| Engine displacement | 4400 cc (made by Nissan Motor Co., Ltd.) |
| Temperature of exhaust gas at inlet of catalyst | 850° C. at upstream side 750° C. at downstream side |
| Aging time | 100 hours |
| Composition of exhaust gas | CO: 0.5 ± 0.1% |
| | $O_2$: 0.5 ± 0.1% |
| | HC: about 1100 ppm |
| | NOx: 1300 ppm |
| | $CO_2$: 15% |
| Evaluation conditions | |
| Engine displacement | 2000 cc |
| Fuel | leadless gasoline |
| Evaluation mode | FTP mode |

TABLE 1

Evaluation results of catalyst activity after aging

| | Amount of noble metal (g/L) | Amount of alkaline earth metal compound added (g/L) | | Purification ratio (%) | | |
| --- | --- | --- | --- | --- | --- | --- |
| | | upstream side | downstream side | HC | CO | NOx |
| Example 1 | Pd = 2.6, Rh = 0.24 | Ba = 5 | Ba = 30 | 97.4 | 93.3 | 95.4 |
| Example 2 | Pd = 2.6, Rh = 0.24 | Ba = 0.5 | Ba = 30 | 97.2 | 93.5 | 94.4 |

TABLE 1-continued

Evaluation results of catalyst activity after aging

|  | Amount of noble metal (g/L) | Amount of alkaline earth metal compound added (g/L) | | Purification ratio (%) | | |
|---|---|---|---|---|---|---|
|  |  | upstream side | downstream side | HC | CO | NOx |
| Example 3 | Pd = 5.7 | Ba = 10 | Ba = 40 | 97.6 | 94.5 | 89.4 |
| Example 4 | Pd = 5.7 | Sr = 10 | Sr = 40 | 97.7 | 93.4 | 89.4 |
| Comparative Example 1 | Pd = 2.6, Rh = 0.24 | — | — | 94.2 | 92.5 | 93.4 |
| Comparative Example 2 | Pd = 2.6, Rh = 0.24 | Ba = 30 | Ba = 30 | 94.3 | 92.7 | 93.3 |
| Comparative Example 3 | Pd = 2.6, Rh = 0.24 | Ba = 5 | Ba = 5 | 94.8 | 93.2 | 93.3 |
| Comparative Example 4 | Pd = 5.7 | — | — | 97.1 | 93.4 | 89.3 |
| Comparative Example 5 | Pd = 5.7 | Ba = 40 | Ba = 40 | 96.4 | 93.4 | 89.3 |

As seen from Table 1, the catalyst systems for the purification of exhaust gas according to the invention can considerably enhance the purification performance of the exhaust gas because at least two catalysts for the purification-of exhaust gas at least containing palladium are disposed in the exhaust system of the engine and the upstream side catalyst contains 0.1–20 g of the alkaline earth metal compound as an oxide conversion per 1 L of the carrier and the downstream side catalyst containing more than 20 g but not more than 100 g of of the alkaline earth metal compound as an oxide conversion per 1 L of the carrier. That is, the amount of the alkaline earth metal compound added is made optimum so as to improve the purification performance at high temperature zone in the upstream side catalyst and the activity at low temperature in the downstream side catalyst because the temperature of the exhaust gas is high just after the outlet of the engine and becomes lower away from the engine.

In the catalyst system for the purification of exhaust gas according to the invention, the exhaust gas can efficiently be purified by disposing the catalyst having the high purification performance at high temperature zone on the upstream side of the exhaust system and the catalyst having the high activity at low temperature zone on the downstream side of the exhaust system, respectively.

What is claimed is:

1. A catalyst system for the purification of exhaust gas comprising at least two catalysts separately disposed on an exhaust system side of an engine and at least containing palladium as a catalyst component, in which a catalyst disposed on an upstream side of said exhaust system contains 0.1–20 g of an alkaline earth metal oxide per 1 L of a carrier, and a catalyst disposed on a downstream side of said exhaust system contains more than 20 g but not more than 100 g of an alkaline earth metal oxide, per 1 L of a carrier.

2. A catalyst system according to claim 1, where the alkaline earth metal oxide is formed by impregnation of the catalyst component with a compound selected from the group consisting of nitrates, acetates, carbonates, hydroxides and oxides.

3. A catalyst system according to claim 1, wherein the alkaline earth metal is barium and the oxide is barium oxide.

4. A catalyst system according to claim 1, wherein rhodium and/or platinum are further included as the catalyst component.

5. A catalyst system according to claim 1, wherein an amount of the catalyst component is 0.01–10 g per 1 L of the catalyst.

* * * * *